Figure 1:
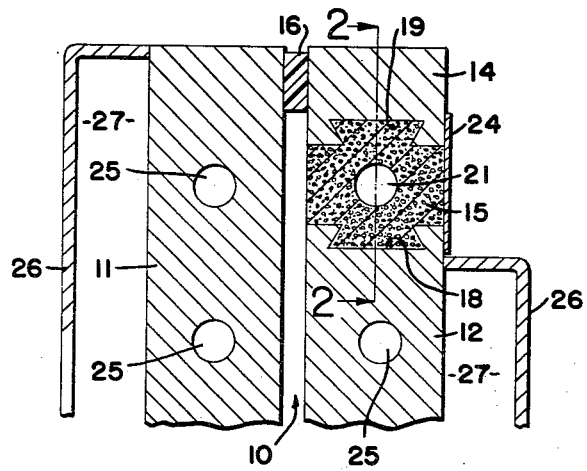

April 16, 1957  J. S. WISHART  2,789,089
PORT CONSTRUCTION FOR THERMAL DIFFUSION APPARATUS
Filed April 23, 1954

INVENTOR.
JAMES S. WISHART

BY
ATTORNEY

United States Patent Office 2,789,089
Patented Apr. 16, 1957

2,789,089
PORT CONSTRUCTION FOR THERMAL DIFFUSION APPARATUS

James S. Wishart, Cleveland Heights, Ohio, assignor to The Standard Oil Company, Cleveland, Ohio, a corporation of Ohio Application April 23, 1954, Serial No. 425,232

1 Claim. (Cl. 210—176)

The present invention relates to liquid thermal diffusion apparatus and, more particularly, to novel and improved port construction.

Thermal diffusion is a term intended herein to define a process by which a mixture, liquid under operating conditions, is separated into two or more fractions differing in composition from the composition of the original mixture, said separation being accomplished by subjecting a thin film of the mixture which is to be separated to a temperature gradient.

In accordance with the thermal diffusion techniques disclosed in U. S. Patent No. 2,541,069, the separation chamber may be formed between two parallel surfaces maintained at substantially different temperatures which are spaced apart a small distance. A liquid mixture may then be fed into the separation chamber, and the different products of the fluid that are separated within the chamber are then withdrawn from the chamber. In another flow pattern which may be used, the feed enters at one end of the separation chamber while the products are withdrawn from the opposed surfaces at the opposite extremity of the separation chamber. However, regardless of the flow pattern, it has been found in actual practice that in order to attain an increased degree of separation of the fluid within the chamber into its respective products, it is desirable to have an even distribution of the flow of the fluid into, through, and from the separation chamber. This is especially true in chambers formed by flat plates. Accordingly, the design of the feed and withdrawal ports for the feed fluid and separation products has been found to be important. The requirement of uniform fluid distribution has also been found to be significant in the use of multiple plate thermal diffusion apparatus, wherein a plurality of thermal diffusion separation chambers are arranged in parallel fashion.

It is an object of the present invention, accordingly, to provide novel and improved port structures which will meet the above requirements.

In accordance with the invention, attachments are provided which can be machined or cast apart from the plates that constitute the walls of the separation chambers. These attachments may be fitted to the separation chamber walls to provide ports having the correct apertures. These attachments may have a configuration such that reservoirs are provided adjacent the slits leading into the separation chambers when the units are assembled. These reservoirs may have a volume large in comparison with the aperture area of the slits so as to provide equal liquid pressure throughout the reservoir.

Figure 2:
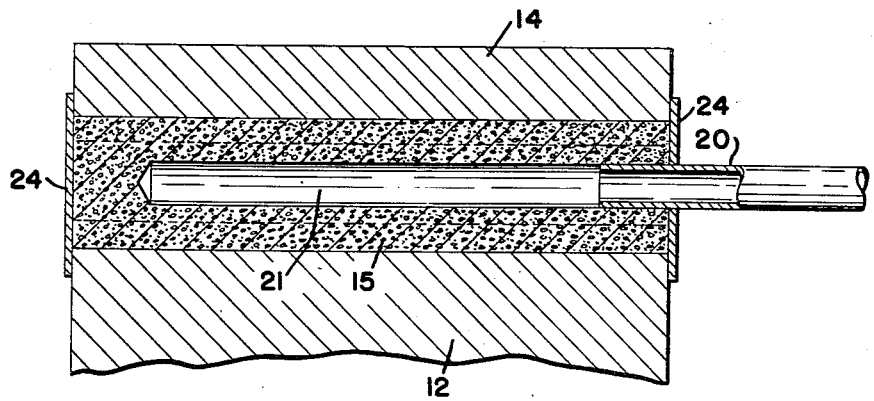

The invention will be better understood by reference to the following detailed description of the preferred embodiment of this invention taken in conjunction with the accompanying figures of the drawing wherein similar reference figures denote similar parts throughout in which, Figure 1 is a transverse sectional view of a portion of a thermal diffusion unit utilizing a porous port in accordance with the invention; and Figure 2 is a longitudinal sectional view of one of the plates in Figure 1 taken along the line 2—2 to the sectional plane of Figure 1 at right angles and looking in the direction of the arrows.

In Figure 1 a separation chamber 10 is formed between a plate 11 and a plate formed of two sections 12 and 14 with a porous port 15 therebetween. Both of the plates are provided with heat transfer means such as the coils 25 embedded in the plates, or by the jackets 26 forming chambers 27. A heat transfer medium may be supplied to the coils and/or jackets so that one plate is maintained at a higher temperature than the other. The separation chamber 10 is sealed by a gasket and spacing means 16 disposed between the plate 11 and the plate section 14.

The porous port attachment 15 may be composed of any suitable material having a porosity so that liquid will flow therethrough, such as porous metal, porous ceramic, etc. It has a configuration such that it may be separably assembled with the plate sections 12 and 14 between which it is disposed. Any structure may be used for this purpose. For example, the plate sections 12 and 14 may have keyways 18 and 19, respectively, placed in adjacent transverse edges, and the porous port 15 has a complementary shape permitting it to be snugly received within the keyways 18 and 19. Obviously the keyways may alternatively be formed in the attachment 15.

The porous port 15 is fed by a conduit 20 leading into an elongated duct 21 extending substantially the length of the porous port 15, as shown in greater detail in Figure 2.

The exposed sides of the porous port 15 away from the separation chamber 10 may be sealed in any suitable manner such as by a plate 24 which is attached to the sections 14 and 12 and is impervious to the fluid that is to flow between the duct 21 and the separation chamber 10.

While the porous port is shown at the extremity of the separation chamber 10, it could be located elsewhere with respect to the separation chamber, e. g., in the middle of the plate. It may be used as a feed or withdrawal port and each plate may contain one or more of the ports of this invention. The attachment 15 may comprise the end of the plate in which only one keyway is needed and the plate 14 is omitted, provided the portions of the attachment through which liquid is not to flow are suitably sealed as explained heretofore.

Thus there has been provided a novel and improved porous port for use in thermal diffusion apparatus which will produce a uniform flow of liquid in the separation chamber 10 and, furthermore, will considerably simplify the construction of this type of thermal diffusion apparatus.

Modifications of this invention will occur to those skilled in the art, but this invention is not deemed to be limited except by the appended claim.

I claim:

An improved port means for liquid thermal diffusion apparatus comprising a hollow porous member pervious to liquid, said hollow porous member being provided with at least one raised surface forming a key which is adapted to engage in sealing relation a keyway, corresponding to said key, in a wall of a thermal diffusion separation chamber, so as to form a contiguous porous surface in the face of said wall, means communicating with the hollow interior of said porous member by means of which a liquid may be introduced into said hollow interior, and means disposed in sealing relation to external surfaces of said porous member so that liquid may flow only from the contiguous porous surface which faces the interior of said thermal diffusion separation chamber.

References Cited in the file of this patent

UNITED STATES PATENTS

| | | |
|---|---|---|
| 868,838 | Brewington | Oct. 22, 1907 |
| 2,081,382 | Piatt | May 25, 1937 |
| 2,354,609 | Phipps | July 25, 1944 |
| 2,541,069 | Jones et al. | Feb. 13, 1951 |
| 2,541,071 | Jones et al. | Feb. 13, 1951 |
| 2,720,976 | Jones | Oct. 18, 1955 |